(12) United States Patent
Koide et al.

(10) Patent No.: US 11,449,328 B2
(45) Date of Patent: Sep. 20, 2022

(54) COMMUNICATION CONTROL DEVICE, COMMUNICATION CONTROL METHOD, AND STORAGE MEDIUM

(71) Applicant: FUJITSU LIMITED, Kawasaki (JP)

(72) Inventors: Arata Koide, Shinagawa (JP); Masanori Naganuma, Yokohama (JP); Shotaro Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 147 days.

(21) Appl. No.: 16/996,966

(22) Filed: Aug. 19, 2020

(65) Prior Publication Data
US 2021/0064358 A1 Mar. 4, 2021

(30) Foreign Application Priority Data

Aug. 30, 2019 (JP) .............................. JP2019-158366

(51) Int. Cl.
G06F 3/00 (2006.01)
G06F 8/656 (2018.01)
G06F 15/17 (2006.01)
G06F 11/20 (2006.01)
G06F 13/12 (2006.01)
G06F 13/42 (2006.01)

(52) U.S. Cl.
CPC .......... *G06F 8/656* (2018.02); *G06F 11/2038* (2013.01); *G06F 13/12* (2013.01); *G06F 13/128* (2013.01); *G06F 13/42* (2013.01); *G06F 15/17* (2013.01)

(58) Field of Classification Search
None
See application file for complete search history.

(56) References Cited

U.S. PATENT DOCUMENTS

| 5,507,032 | A | | 4/1996 | Kimura | |
|---|---|---|---|---|---|
| 5,859,973 | A | * | 1/1999 | Carpenter | H04L 67/325 709/229 |
| 8,395,632 | B2 | * | 3/2013 | Misra | G06F 9/3824 345/545 |
| 2005/0198379 | A1 | * | 9/2005 | Panasyuk | H04L 63/08 709/224 |
| 2009/0222600 | A1 | * | 9/2009 | Lehr | G06F 9/5027 710/39 |

FOREIGN PATENT DOCUMENTS

| JP | H04-211857 A | 8/1992 |
|---|---|---|
| JP | 2001-265491 A | 9/2001 |
| JP | 2014-215724 A | 11/2014 |

* cited by examiner

Primary Examiner — Henry Tsai
Assistant Examiner — Dean Phan
(74) Attorney, Agent, or Firm — Fujitsu Patent Center

(57) ABSTRACT

A communication control device, includes a memory; and a processor coupled to the memory and the processor configured to: store, in the memory, instructions of standby processing in a specific processing order, when a network coupling is being established to perform communication, acquire a specific instructions, update, in the memory, the instructions of standby processing based on a type of the specific instructions, a type of the instructions of standby processing and a relationship specified by order in which the specific instructions are acquired, and after an establishment of the network coupling is completed, perform the instructions of standby processing in a specific processing order.

7 Claims, 12 Drawing Sheets

FIG. 3

| HELD DATA | DETAILS |
|---|---|
| TIMER INFORMATION | MONITOR TIME UNTIL NETWORK BETWEEN HOST-SIDE COMMUNICATION CONTROL DEVICE AND I/O DEVICE-SIDE COMMUNICATION CONTROL DEVICE IS COUPLED |
| INITIAL COUPLING MONITORING FLAG | FLAG INDICATING THAT INITIAL COUPLING IS BEING MONITORED |
| THREAD ID UNDER MONITORING | THREAD ID UNDER MONITORING USING TIMER |
| PATH ID UNDER MONITORING | PATH ID UNDER MONITORING USING TIMER |
| STATE OF LOGICAL PATH | FLAG INDICATING WHETHER OR NOT LOGICAL PATH HAS BEEN ESTABLISHED |

FIG. 4

| I/O INSTRUCTION TYPE | | EXECUTED PROCESSING |
|---|---|---|
| STORED I/O INSTRUCTION | NEWLY RECEIVED I/O INSTRUCTION | |
| COMMAND-RELATED INSTRUCTION | COMMAND-RELATED INSTRUCTION | DISCARD STORED COMMAND-RELATED INSTRUCTION<br>STORE NEWLY RECEIVED COMMAND-RELATED INSTRUCTION |
| COMMAND-RELATED INSTRUCTION | CANCELLATION-RELATED INSTRUCTION | DISCARD STORED COMMAND-RELATED INSTRUCTION<br>STORE NEWLY RECEIVED CANCELLATION-RELATED INSTRUCTION |
| CANCELLATION-RELATED INSTRUCTION | COMMAND-RELATED INSTRUCTION | LEAVE STORED CANCELLATION-RELATED INSTRUCTION<br>STORE NEWLY RECEIVED CANCELLATION-RELATED INSTRUCTION |
| CANCELLATION-RELATED INSTRUCTION | CANCELLATION-RELATED INSTRUCTION OF SAME TYPE | DISCARD STORED CANCELLATION-RELATED INSTRUCTION<br>STORE NEWLY RECEIVED CANCELLATION-RELATED INSTRUCTION |
| CANCELLATION-RELATED INSTRUCTION | CANCELLATION-RELATED INSTRUCTION OF DIFFERENT TYPE | LEAVE STORED CANCELLATION-RELATED INSTRUCTION<br>STORE NEWLY RECEIVED CANCELLATION-RELATED INSTRUCTION |

FIG. 5

| INITIAL COUPLING MONITORING FLAG | STATE OF LOGICAL PATH | EXECUTED PROCESSING | STATE OF I/O DEVICE-SIDE COMMUNICATION CONTROL DEVICE |
|---|---|---|---|
| 0 | 0 | RETURN NOTIFICATION OF NOT OPERATIONAL | DIFFICULT TO USE I/O DEVICE |
| 0 | 1 | EXECUTE I/O INSTRUCTION | I/O DEVICE IS AVAILABLE |
| 1 | 0 | INSTRUCTION STANDBY PROCESSING | COUPLING PROCESSING IS BEING EXECUTED |
| 1 | 1 | - | - |

COMMUNICATION CONTROL DEVICE, COMMUNICATION CONTROL METHOD, AND STORAGE MEDIUM

CROSS-REFERENCE TO RELATED APPLICATION

This application is based upon and claims the benefit of priority of the prior Japanese Patent Application No. 2019-158366, filed on Aug. 30, 2019, the entire contents of which are incorporated herein by reference.

FIELD

The embodiment discussed herein relates to a communication control device, a communication control method, and a storage medium.

BACKGROUND

For some information processing apparatuses, a response time is to be strictly observed. For example, a response to an output instruction in a predetermined time is often strictly specified In a mainframe or the like.

An information processing apparatus that serves as a host and an input/output (I/O) device adapted to perform processing in response to instructions from the host may be disposed at locations that are separated from each other by 2000 km, for example in some cases. In a case in which the host and the I/O device disposed at remote locations are coupled via a wide area network, it is conceivable that in a case in which the host outputs an instruction to the I/O device, a delay until a response is returned to the host increases. In order to reliably meet a condition for a response time in such an environment, a communication control device adapted to perform processing in consideration of the delay and stabilize the communication between the host and the I/O device may be disposed between the host and the I/O device disposed at the separate locations. As such a communication control device, an apparatus adapted to return a response to the host immediately after receiving an instruction and perform transmission of an instruction and reception of a respond to and from the I/O device in an unsynchronized manner is present.

As an exemplary system configuration including such a communication control device, there is a system configuration in which a host-side communication control device adapted to perform communication control is mounted on the host side and an I/O device-side communication control device coupled to an I/O device is disposed at a location beyond a wide area network. In this case, the host-side communication control device operates as one of channels that perform communication of the host. The host recognizes the host-side communication control device as a mounted I/O device mounted in the host device itself.

In a case of the configuration in which the host-side communication control device mounted in the host, once initialization of the host is executed when a power is supplied to the host, each device mounted in the host including the host-side communication control device is reset, and activation is executed. The initialization of the host performed when the power is supplied may be called power-on reset. At this time, the host executes automatic incorporation of each mounted I/O device that has been reset. However, in a case in which the mounted I/O device that the host is attempting to incorporate is not coupled, or in a case in which the mounted I/O device is not available due to discoupling of a power source, a response representing "not operational" is returned to the host. In a case of the host-side communication control device, a response representing "not operational" is returned if network is discoupled between the locations.

Once the host-side communication control device is activated through the power-on reset of the host, the host-side communication control device starts to couple the network through initialization processing. At this time, it may take a time of several seconds until network coupling between the host and the I/O device is completed. On the other hand, an I/O instruction from the host is issued several hundreds of milliseconds after the power-on reset in an early case. In a case in which the I/O instruction is issued from the host for the host-side communication control device that is performing network coupling processing, the host-side communication control device returns a reply representing "not-operational" due to an unopened network. As a result, the host determines that it is difficult to use the mounted host-side communication control device regardless of the state that is not an abnormal state since the network is temporally discoupled due to the initialization. There is a problem that in this case, the host does not execute processing using the host-side communication control device.

As a technology for addressing this problem, there is a related art in which "busy" is returned as a pseudo response in response to the I/O instruction transmitted from the host and the host is caused to wait for a response. There is also a related art in which a pseudo response is returned to a computer instead of a keyboard as a related art for a pseudo response. In addition, there is also a related art in which I/O instructions are managed in an activation standby queue in a case in which an I/O device is executing processing, as a method of processing I/O instructions. For example, Japanese Laid-open Patent Publication Nos. 2014-215724, 2001-265491, 4-211857, and the like are disclosed.

SUMMARY

According to an aspect of the embodiments, A communication control device, includes a memory; and a processor coupled to the memory and the processor configured to: store, in the memory, instructions of standby processing in a specific processing order, when a network coupling is being established to perform communication, acquire a specific instructions, update, in the memory, the instructions of standby processing based on a type of the specific instructions, a type of the instructions of standby processing and a relationship specified by order in which the specific instructions are acquired, and after an establishment of the network coupling is completed, perform the instructions of standby processing in a specific processing order.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a network state management table;

FIG. 4 is a diagram for explaining processing for updating an I/O instruction queue;

FIG. 5 is a diagram illustrating processing performed by the host-side communication control device in accordance with a state at the time of receiving an I/O instruction;

DESCRIPTION OF EMBODIMENTS

However, in a case in which a pseudo response is provided, an I/O instruction is discarded after the response, and a host may thus not issue a request again after the pseudo response depending on a type of the I/O instruction. In a case of an I/O instruction such as cancellation for canceling a previous instruction, for example, no response for waiting is present, and thus the host does not issue a request again. If no I/O instruction for which a pseudo response has been issued remains in this manner, it is difficult to execute an I/O instruction for which a pseudo response has been issued after completion of initialization. In a case in which a plurality of I/O instructions are received during initialization, there is a concern that an order indicated by the source that has issued the I/O instructions is not followed due to discarding of the I/O instructions after the pseudo response. In regard to a cancellation instruction, for example, there is a concern that an I/O instruction as a target of cancellation is executed regardless of discarding thereof. It is also conceivable that a host-side communication control device manages details, an order, and the like of I/O instructions to be executed after completion of initialization in order to maintain the order and address non-execution of re-issuing and the like. However, a large number of issued I/O instructions are held by the host-side communication control device, and it is difficult to realize this due to restriction of a memory region.

In view of the aforementioned circumstances, it is desirable to appropriately process I/O instructions after completion of initialization.

Hereinafter, embodiments of a communication control device, a communication control method, and a communication control program disclosed in the present application will be described in detail with reference to the drawings. The communication control device, the communication control method, and the communication control program disclosed in the present application are not limited to the following embodiments.

Figure 1:
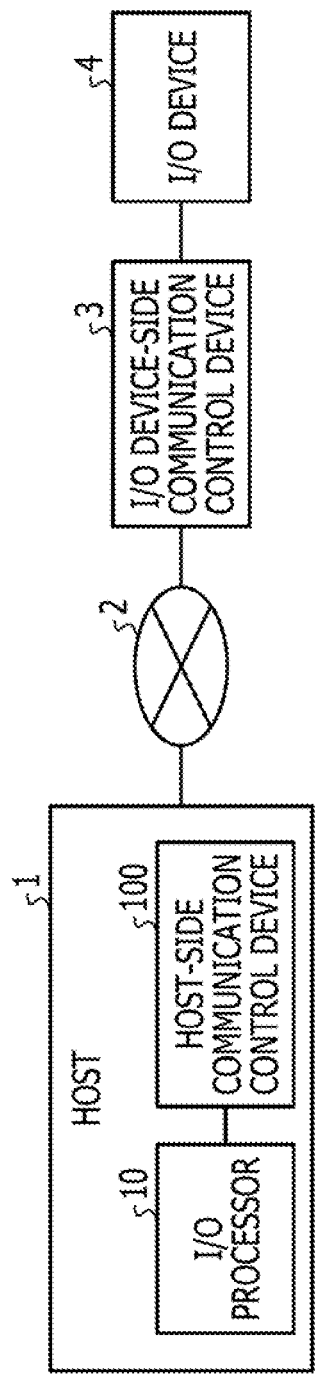
FIG. 1 is a system configuration diagram of an information system in which a host and an I/O device are disposed at separate locations.

FIG. 1 is a system configuration diagram of an information system in which a host and an I/O device are disposed at separate locations. As illustrated in FIG. 1, the information system according to this embodiment includes a host 1, a wide area network 2, an I/O device-side communication control device 3, and an I/O device 4.

The I/O device 4 is a device as a target of data transmission and reception with the host 1. The I/O device 4 is, for example, a printer apparatus, a tape storage device, and a console such as a keyboard and a display device. One or more I/O devices 4 may be provided for one host 1.

The host 1 is, for example, a mainframe. An I/O processor 10 and a host-side communication control device 100 are mounted on the host 1. The host 1 further includes a central processing unit (CPU), a memory, a hard disk, and the like, which are omitted in FIG. 1. The host 1 is initialized when the power is supplied. This initialization when the power is supplied will be referred to as power-on reset.

The I/O processor 10 generates an I/O instruction for the I/O device 4 and transmits the I/O instruction to the host-side communication control device 100. The I/O processor 10 receives, from the host-side communication control device 100, a response from the I/O device 4 to the transmitted I/O instruction. Although the I/O processor 10 actually transmits and receives I/O instructions between the host-side communication control device 100 and the main body of the host 1 as described above, the following description may be provided as the host 1 transmitting and receiving I/O instructions to and from the host-side communication control device 100.

The I/O instructions sent from the host 1 include command-related I/O instructions and cancellation-related I/O instructions. The command-related I/O instructions are instructions for operating the I/O device 4. The command-related I/O instructions include a data reading instruction and a writing instruction with respect to the storage device. The command-related I/O instructions Include a tape rewinding operation, a console screen deleting operation, and the like.

As the cancellation-related I/O instructions, three types of I/O instructions, namely cancellation, clear, and reset, are present. The cancellation is an instruction for discarding a command-related I/O instruction that has already been sent. Clear and reset are instructions for initializing the I/O device 4. For the cancellation-related I/O instructions, no response for causing the host 1 to wait for completion of processing is present. Thus, even if the host 1 receives a pseudo response for a notification of "busy" as a response to a cancellation-related I/O instruction, for example, the host 1 ignores "busy" and does not send the cancellation-related I/O instruction again.

The host-side communication control device 100 establishes network coupling with the I/O device-side communication control device 3 via the wide area network 2. The host-side communication control device 100 then receives the I/O instruction transmitted from the host 1 and issues the I/O instruction to the I/O device-side communication control device 3 using the established network coupling. The host-side communication control device 100 receives the response sent from the I/O device 4 using network coupling established with the I/O device-side communication control device 3 and transfers the response to the host 1. The host-side communication control device 100 executes processing in consideration of a delay in transmission and reception of an I/O instruction in cooperation with the I/O device-side communication control device 3. For example, the host-side communication control device 100 executes compression and the like of data to be transmitted.

The host-side communication control device 100 is activated and initialized at the time of the power-on reset of the host 1. When the initialization is executed, the host-side communication control device 100 establishes network coupling. In a case in which an I/O instruction is received from the host when the network coupling is established through power-on reset, the host-side communication control device 100 executes instruction standby processing for holding and managing the received I/O instruction. Thereafter, the host-side communication control device 100 transmits the held I/O instruction to the I/O device-side communication control device 3 using the established network coupling after the completion of initialization. The instruction standby processing performed by the host-side communication control device 100 will be described later in detail.

The wide area network 2 is an intra-company local area network (LAN) or the like. The wide area network 2 is, for example, a network that couples locations separated by about 2000 km.

The I/O device-side communication control device 3 couples the I/O device 4 to the wide area network 2. The I/O device-side communication control device 3 receives the I/O instruction issued by the host-side communication control device 100 using the established network coupling over the wide area network 2. The I/O device-side communication control device 3 then transmits the received I/O instruction to the I/O device 4. The I/O device-side communication control device 3 cooperates with the host-side communication control device 100 to execute processing in consideration of a delay in transmission and reception of an I/O instruction.

Figure 2:
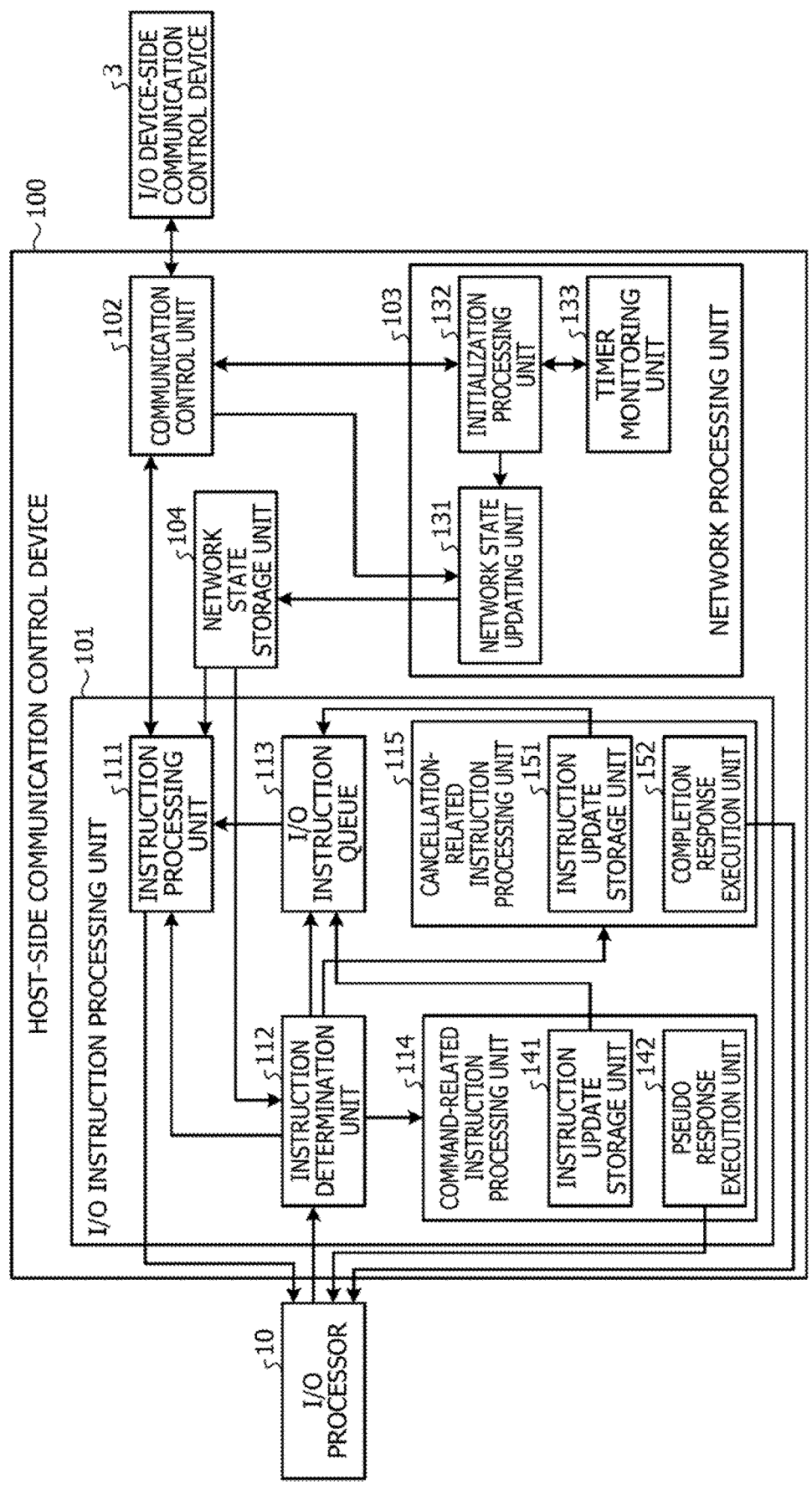
FIG. 2 is a block diagram of a host-side communication control device according to an embodiment.

FIG. 2 is a block diagram of the host-side communication control device according to this embodiment. In FIG. 2, the wide area network 2 is omitted, and the coupling between the host-side communication control device 100 and the I/O device-side communication control device 3 is illustrated. As illustrated in FIG. 2, the host-side communication control device 100 includes an I/O instruction processing unit 101, a communication control unit 102, a network processing unit 103, and a network state storage unit 104.

The communication control unit 102 controls a network with the I/O device-side communication control device 3. For example, the communication control unit 102 receives a direction to establish a network from the network processing unit 103 when the host-side communication control device 100 is activated. The communication control unit 102 then executes processing for establishing network coupling with the I/O device-side communication control device 3. For example, the communication control unit 102 performs a TCP session coupling with the I/O device-side communication control device 3. Next, the communication control unit 102 transmits a system reset request (SYSTEMRESET_REQ), receives a system reset response (SYSTEMRESET_RESP), and transmits a logical path status change request (LPATH_STSCHG_REQ) to and from the I/O device-side communication control device 3. Thus, a logical path is established. Thereafter, the communication control unit 102 outputs a notification of completion of establishment of the network to the network processing unit 103.

In a case in which a predetermined time has elapsed for the initialization processing, the communication control unit 102 receives a notification of time-out from the network processing unit 103. In this case, the communication control unit 102 stops the establishment of the network coupling.

The communication control unit 102 transmits the I/O instruction input from the I/O instruction processing unit 101 to the I/O device-side communication control device 3 and issues the I/O instruction to the I/O device 4. The communication control unit 102 receives, from the I/O device-side communication control device 3, a response sent from the I/O device 4. The communication control unit 102 then outputs the received response to the I/O instruction processing unit 101.

In a case in which the logical path is discoupled when communication is being performed with the I/O device-side communication control device 3 after completion of initialization, the communication control unit 102 outputs a notification of discoupling along with a path ID of the logical path to the network state updating unit 131.

The network state storage unit 104 includes a network state management table 201 in which a network state with the I/O device-side communication control device 3 is registered. FIG. 3 is a diagram illustrating an example of the network state management table. As illustrated in FIG. 3, timer information, an initial coupling monitoring flag, a thread ID under monitoring, a path ID under monitoring, and a state of a logical path are registered in the network state management table 201.

A network between the host-side communication control device 100 and the I/O device-side communication control device 3 will now be described. A case in which a plurality of I/O devices 4 are coupled to the host 1 will now be described. Logical paths are established between the host-side communication control device 100 and the I/O device-side communication control devices 3. The number of logical paths may be one or more. The logical paths include a plurality of coupling routes coupling different I/O devices 4 to the host-side communication control device 100. One timer is provided for all logical paths to monitor time-out of network coupling.

The network state management table 201 is generated for each logical path. The timer information is information regarding time-out of network coupling based on the measurement time of the timer. The initial coupling monitoring flag is information indicating whether or not initial coupling monitoring, which is monitoring of an I/O instruction in instruction standby processing when initialization through power-on reset is executed, is being performed. For example, the initial coupling monitoring flag "0" Indicates that the initial coupling monitoring has not yet been executed, and the initial coupling monitoring flag "1" indicates that the initial coupling monitoring is being executed. The thread ID under monitoring is information indicating a thread ID which is identification information allocated to each I/O device 4 for which an I/O instruction transmitted and received in the initial coupling monitoring is a target of monitoring. The path ID under monitoring is information indicating a path ID that is identification information allocated to a logical path through which an I/O instruction as a target of monitoring in the initial coupling monitoring is transmitted and received. The state of the logical path is information indicating whether or not a logical path has been established. The state of the logical path "0" Indicates that the state of the logical path has not yet been established, and the state of the logical path "1" indicates that the logical path has been established.

The I/O instruction processing unit 101 includes an instruction processing unit 111, an instruction determination unit 112, an I/O instruction queue 113, a command-related instruction processing unit 114, and a cancellation-related instruction processing unit 115. The I/O instruction processing unit 101 has two operation modes, namely a normal operation mode and an instruction standby processing mode. The instruction standby processing mode is an operation mode during initialization of the host-side communication control device 100. The normal operation mode is an operation mode in a state other than the state during initialization.

The instruction determination unit 112 receives an input of an I/O instruction from the I/O processor 10. Next, the instruction determination unit 112 checks the network state management table 201 stored in the network state storage unit 104 to determine which of the normal operation mode or the instruction standby processing mode the operation mode is. The instruction determination unit 112 may determine whether or not the mode is the instruction standby processing mode based on the initial coupling monitoring flag in the network state management table 201. In the normal operation mode, the instruction determination unit 112 outputs the acquired I/O instruction to the instruction processing unit 111.

On the other hand, in the instruction standby processing mode, the instruction determination unit 112 checks whether or not an I/O instruction has been stored in the I/O instruction queue 113. In a case in which the I/O instruction has not been stored in the I/O instruction queue 113, the instruction determination unit 112 stores the acquired I/O instruction in the I/O instruction queue 113. The instruction determination unit 112 determines whether or not the I/O instruction stored in the I/O instruction queue 113 is a command-related instruction. When the I/O instruction is a command-related instruction, the instruction determination unit 112 provides a direction to transmit a pseudo response to the command-related instruction processing unit 114. On the other hand, in a case in which the I/O instruction is a cancellation-related instruction, the instruction determination unit 112 provides a direction to transmit a completion response to the cancellation-related instruction processing unit 115.

On the other hand, in a case in which the I/O instruction has already been stored in the I/O instruction queue 113, the instruction determination unit 112 determines which of the command-related instruction or the cancellation-related instruction the received I/O instruction is. In a case in which the received I/O instruction is a command-related instruction, the instruction determination unit 112 outputs the received I/O instruction to the command-related instruction processing unit 114. On the other hand, in a case in which the received I/O instruction is a cancellation-related instruction, the instruction determination unit 112 outputs the received I/O instruction to the cancellation-related instruction processing unit 115.

The instruction processing unit 111 receives an input of an I/O instruction from the instruction determination unit 112 in the normal operation mode. The instruction processing unit 111 then checks the network state management table 201 stored in the network state storage unit 104 to determine whether or not a logical path has been established. In a case in which the logical path has been established, the instruction processing unit 111 outputs the acquired I/O instruction to the communication control unit 102. Thereafter, the instruction processing unit 111 receives, from the communication control unit 102, an input of a response to the output I/O instruction. In a case in which the acquired response is a response to a command-related I/O instruction, the instruction processing unit 111 transmits the response to the I/O processor 10. On the other hand, in a case in which the logical path has not yet been established, the instruction processing unit 111 notifies the I/O processor 10 of "not operational".

The instruction processing unit 111 uses the network state management table 201 stored in the network state storage unit 104 to recognize that the initialization of the host-side communication control device 100 through the power-on reset has been completed and the transition from the instruction standby processing mode to the normal operation mode has been experienced. In this case, the instruction processing unit 111 acquires I/O instructions stored in the I/O instruction queue 113 in the order from the oldest storage timing and outputs the acquired I/O instructions to the communication control unit 102. Thereafter, the instruction processing unit 111 receives, from the communication control unit 102, a response to the I/O instruction read from the I/O instruction queue 113 and output. In a case in which the acquired response is a response to a command-related I/O instruction, the instruction processing unit 111 transmits the response to the I/O processor 10. The instruction processing unit 111 corresponds to an example of the "processing control unit".

The I/O instruction queue 113 is a fast-in-fast-out (FIFO) queue. The I/O instruction queue 113 places an input I/O instruction at the end of the stored I/O instructions arranged in the storage order. The I/O instruction queue 113 may delete one of the stored I/O instructions and arrange the I/O instructions in the order by filling the area where the deleted I/O instruction was present. The I/O instruction queue 113 corresponds to an example of the "storage unit".

The command-related instruction processing unit 114 processes a command-related I/O instruction in the instruction standby processing mode. The command-related instruction processing unit 114 includes an instruction update storage unit 141 and a pseudo response execution unit 142.

In a case in which the I/O instruction has already been stored in the I/O instruction queue 113 in the instruction standby processing mode, the instruction update storage unit 141 acquires the command-related I/O instruction input from the instruction determination unit 112. Next, the instruction update storage unit 141 checks the type of the I/O instruction stored in the I/O instruction queue 113.

When the I/O instruction stored in the I/O instruction queue 113 is a cancellation-related I/O instruction, the instruction update storage unit 141 outputs a newly received command-related I/O instruction to the I/O instruction queue 113 and stores the newly received command-related I/O instruction therein. On the other hand, in a case in which the I/O instruction stored in the I/O instruction queue 113 is a command-related I/O instruction, the I/O instruction queue 113 is caused to discard the command-related I/O instruction. The instruction update storage unit 141 then outputs the newly received command-related I/O instruction to the I/O instruction queue 113 and stores the I/O instruction therein. As described above, the instruction update storage unit 141 discards the I/O instruction to update the I/O instructions stored in the I/O instruction queue 113 and stores the received I/O instruction in accordance with an anteroposterior relationship determined by the reception order of the I/O instructions. The instruction update storage unit 141 corresponds to an example of the "storage processing unit".

In a case in which no I/O instruction stored in the I/O instruction queue 113 is present in the instruction standby processing mode, the pseudo response execution unit 142 receives a direction to transmit a pseudo response from the instruction determination unit 112. The pseudo response execution unit 142 generates a pseudo response indicating "busy". Thereafter, the pseudo response execution unit 142 transmits the generated pseudo response indicating "busy" to the I/O processor 10.

In a case in which the command-related instruction processing unit 114 receives an input of a command-related I/O instruction from the instruction determination unit 112 in the instruction standby processing mode, the pseudo response execution unit 142 generates a pseudo response indicating "busy". Thereafter, the pseudo response execution unit 142 transmits the generated pseudo response indicating "busy" to the I/O processor 10. The pseudo response execution unit 142 corresponds to an example of the "response unit".

The cancellation-related instruction processing unit 115 processes a cancellation-related I/O instruction in the instruction standby processing mode. The cancellation-related instruction processing unit 115 includes an instruction update storage unit 151 and a completion response execution unit 152.

In the I/O instruction has already been stored in the I/O instruction queue 113 in the instruction standby processing mode, the instruction update storage unit 151 acquires the cancellation-related I/O instruction input from the instruction determination unit 112. Next, the instruction update storage unit 151 checks the type of the I/O instruction stored in the I/O instruction queue 113.

In a case in which the I/O instruction stored in the I/O instruction queue 113 is a command-related I/O instruction, the instruction update storage unit 151 leaves the stored I/O instruction, outputs the newly received command-related I/O instruction to the I/O instruction queue 113 and stores the newly received command-related I/O instruction therein. On the other hand, in a case in which the I/O instruction stored in the I/O instruction queue 113 is the cancellation-related I/O instruction, the instruction update storage unit 151 checks the types of the newly received I/O instruction and the stored I/O instruction as the cancellation-related instruction.

In a case in which there is a stored I/O instruction of the same type as the newly received I/O instruction as the cancellation-related instruction, the instruction update storage unit 151 causes the I/O instruction queue 113 to discard the cancellation-related I/O instruction of the same type. The instruction update storage unit 141 then outputs the newly received cancellation-related I/O instruction to the I/O instruction queue 113 and stores the I/O instruction therein. In this case, there may be a case in which the discarded cancellation-related I/O instruction is in the course of I/O instructions arranged in one row in the storage order, and in such a case, the instruction update storage unit 151 causes the I/O instruction queue 113 to discard the corresponding cancellation-related I/O instruction and then fill the order of the discarded I/O instruction in the I/O instructions arranged in one row in the storage order.

On the other hand, in a case in which there is no stored I/O instruction of the same type as the newly received I/O instruction as a cancellation-related instruction, the instruction update storage unit 151 maintains the stored I/O instruction, outputs the newly received cancellation-related I/O instruction to the I/O instruction queue 113, and stores the newly received cancellation-related I/O instruction therein. As described above, the instruction update storage unit 151 discards the I/O instruction stored in the I/O instruction queue 113 for updating and stores the received I/O instruction in accordance with the anteroposterior relationship determined by the reception order of the I/O instructions. The instruction update storage unit 151 corresponds to an example of the "storage processing unit".

When there is no I/O instruction stored in the I/O instruction queue 113 in the instruction standby processing mode, the completion response execution unit 152 receives a direction to transmit a completion response from the instruction determination unit 112. The completion response execution unit 152 then generates a completion response. Thereafter, the pseudo response execution unit 142 transmits the generated completion response to the I/O processor 10.

In a case in which the cancellation-related instruction processing unit 115 receives an input of a cancellation-related I/O instruction from the instruction determination unit 112 in the instruction standby processing mode, the completion response execution unit 152 generates a completion response. Thereafter, the pseudo response execution unit 142 transmits the generated completion response to the I/O processor 10. The completion response execution unit 152 corresponds to an example of the "response unit".

As described above, in a case in which the cancellation-related I/O instruction is issued during initialization of the host-side communication control device 100, the cancellation-related I/O instruction is saved in the I/O instruction queue 113 after eliminating duplication of the same type. In the case of I/O instructions of the same time, the same state achieved in a case in which a previous cancellation-related I/O instruction of the same time is executed is achieved by executing the finally issued cancellation-related I/O instruction. Therefore, the host-side communication control device 100 reliably execute the cancellation-related I/O instruction without missing even in a case in which the cancellation-related I/O instruction that is not transmitted again from the host 1 is received during the initialization.

FIG. 4 is a diagram for explaining processing for updating an I/O instruction queue. Processing for updating the I/O instruction queue 113 in accordance with types and an order of I/O instructions will now be collectively described with reference to FIG. 4.

Ina case in which a stored I/O instruction is a command-related instruction and a newly received I/O instruction is a command-related instruction, the command-related I/O instruction stored in the I/O instruction queue 113 is discarded. The newly received command-related I/O instruction is then stored in the I/O instruction queue 113.

In a case in which the stored I/O instruction is a command-related instruction and the newly received I/O instruction is a cancellation-related instruction, the command-related I/O instruction stored in the I/O instruction queue 113 is discarded. The newly received cancellation-related I/O instruction is then stored in the I/O instruction queue 113.

In a case in which the stored I/O instruction is a cancellation-related instruction and the newly received I/O instruction is a command-related instruction, the cancellation-related I/O instruction stored in the I/O instruction queue 113 is left. The newly received command-related I/O instruction is then stored in the I/O instruction queue 113.

In a case in which the stored I/O instruction is a cancellation-related instruction and there is a cancellation-related I/O instruction of the same type as the newly received I/O instruction, the cancellation-related I/O instruction of the same type stored in the I/O instruction queue 113 is discarded. The newly received cancellation-related I/O instruction is then stored in the I/O instruction queue 113.

If the stored I/O instruction is a cancellation-related I/O instruction and there is no cancellation-related I/O instruction of the same type as the newly received I/O instruction, the cancellation-related I/O instruction stored in the I/O instruction queue 113 remains. The newly received cancellation-related I/O instruction is then stored in the I/O instruction queue 113.

It is possible to ascertain the following matters from the above matters. The following description will be given on the assumption that an I/O instruction of an earlier storage order in the I/O instruction queue 113 is an anterior one and an I/O instruction in a later storage order is a posterior one. The I/O instructions of the same type are not stored in the I/O instruction queue 113. A maximum of one command-related I/O instruction is stored. A command-related I/O instruction may be present after a cancellation-related I/O instruction while it does not exist before the cancellation-related I/O instruction. A maximum of three cancellation-related I/O instructions of different types are stored. In other words, a state in which three types of cancellation-related I/O instructions are stored and a command-related I/O instruction is stored thereafter is a state in which a maximum of four I/O instructions are stored in the I/O instruction queue 113, for example.

FIG. 5 is a diagram illustrating processing performed by the host-side communication control device in accordance with a state when an I/O instruction is received. Operations of the host-side communication control device 100 in accordance with a state when an I/O instruction is received will now be collectively described with reference to FIG. 5.

In a case in which an initial coupling flag is "0" and the state of the logical path is "0" in the network state management table 201, this corresponds to a state in which initialization of the host-side communication control device 100 has been completed and no logical path has yet been established. In this case, the host-side communication control device 100 returns a notification of "not operational" to the I/O processor 10. The host 1 determines that the network abnormality has occurred. The state of the I/O device-side communication control device 3 is a state in which it is difficult to use the I/O device 4.

A case in which the initial coupling flag is "0" and the state of the logical path is "1" in the network state management table 201 corresponds to a state in which the initialization of the host-side communication control device 100 has been completed and the logical path has already been established. In this case, the host-side communication control device 100 executes the I/O instruction transmitted from the I/O processor 10. The state of the I/O device-side communication control device 3 is a state in which the I/O device 4 is available.

A case in which the initial coupling flag is "1" and the state of the logical path is "0" in the network state management table 201 corresponds to a state in which the host-side communication control device 100 is being initialized and the logical path has not yet been established. In this case, the host-side communication control device 100 executes instruction standby processing. The host 1 receives a pseudo response or a completion response. The state of the I/O device-side communication control device 3 is a state in which coupling processing with the host-side communication control device 100 is being executed.

A case in which the initial coupling flag is "1" and the state of the logical path is "1" in the network state management table 201 indicates a state in which the host-side communication control device 100 is being initialized and the logical path has been established, and such a state may not be present.

Returning to FIG. 2, the description will be continued. The network processing unit 103 manages the state of the network with the I/O device-side communication control device 3 and manages the use state of the I/O device 4. The network processing unit 103 includes a network state updating unit 131, an initialization processing unit 132, and a timer monitoring unit 133.

The initialization processing unit 132 starts initialization processing when the host-side communication control device 100 is activated through power-on reset of the host 1. The initialization processing unit 132 then requests the communication control unit 102 for establishment of a network. At this time, the initialization processing unit 132 determines a thread ID of a target I/O device 4 for establishing the network and a path ID of the logical path to be established. The initialization processing unit 132 notifies the network state updating unit 131 of the start of the initialization processing along with the thread ID of the I/O device 4 that is the target of establishing the network and the path ID of the logical path to be established. The initialization processing unit 132 notifies the timer monitoring unit 133 of the start of the initialization processing.

Once the establishment of the network is completed thereafter, the initialization processing unit 132 receives a notification of the completion of the network establishment from the communication control unit 102. The initialization processing unit 132 then notifies the network state updating unit 131 of the completion of the initialization processing. The initialization processing unit 132 notifies the timer monitoring unit 133 of the end of the initialization processing.

In a case in which the initialization processing exceeds a predetermined time, the initialization processing unit 132 receives a notification of time-out from the timer monitoring unit 133. In this case, the initialization processing unit 132 notifies the communication control unit 102 and the network state updating unit 131 of the time-out.

Once the notification of the start of the initialization processing is received from the initialization processing unit 132, the timer monitoring unit 133 activates its own timer and starts to measure the elapsed time of the initialization processing. Once the timer monitoring unit 133 receives the notification of the completion of the initialization from the initialization processing unit 132 before a time determined in advance elapses, the timer monitoring unit 205 stops measuring the elapsed time. On the other hand, in a case in which the elapsed time of the initialization processing exceeds the predetermined time, the timer monitoring unit 133 notifies the initialization processing unit 132 of time-out of the initialization processing.

The network state updating unit 131 manages the network state management table 201 stored in the network state storage unit 104. The network state updating unit 131 acquires the thread ID of the I/O device 4 that is a target for establishing the network and the path ID of the logical path to be established. The network state updating unit 131 then generates the network state management table 201 for each logical path and stores the generated network state management table 201 in the network state storage unit 104. Next, the network state updating unit 131 registers the path ID of the logical path and the thread ID of the I/O device 4 using the logical path in each generated network state management table 201. The network state updating unit 131 sets the timer information in each network state management table 201 to "during initialization processing". The network state updating unit 131 sets the initial coupling monitoring flag of each network state management table 201 to "1" indicating that monitoring is in progress. The network state updating unit 131 sets the state of the path in each network state management table 201 to "0" indicating "unestablished".

Thereafter, once the notification of the completion of the initialization is received from the initialization processing unit 132, the network state updating unit 131 registers information indicating completion in the timer information in each network state management table 201. The network state updating unit 131 sets the initial coupling monitoring flag in each network state management table 201 to "0" indicating that monitoring is in progress. The network state updating unit 131 sets the state of the path in each network state management table 201 to "1" indicating "established".

Once the notification of time-out is received from the initialization processing unit 132, the network state updating unit 131 registers information indicating time-out in the timer information in each network state management table 201.

Once the logical path is discoupled during execution of normal communication after the completion of the initialization, the network state updating unit 131 receives a notification of discoupling from the communication control unit 102 along with the path ID of the logical path. In this case, the network state updating unit 131 changes the state of the path in the network state management table 201, in which the notified path ID is registered, to "0" indicating that the path has not yet been established.

Figure 6:
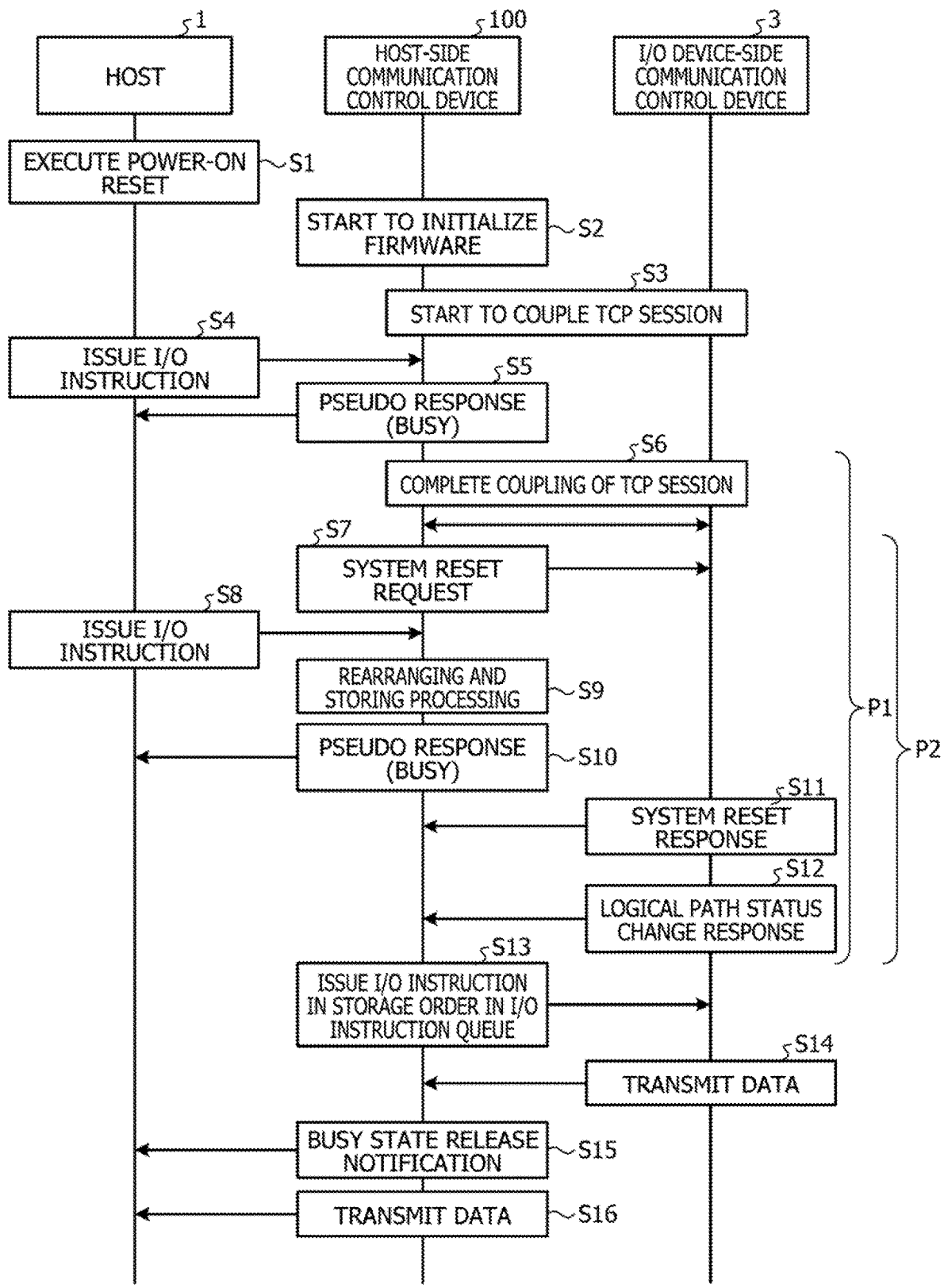
FIG. 6 is a sequence diagram for initializing the host-side communication control device through power-on reset.

Next, referring to FIG. 6, an overall flow of initialization of the host-side communication control device 100 through power-on reset will be described. FIG. 6 is a sequence diagram of initialization of the host-side communication control device through power-on reset.

The power-on reset is executed when a power is supplied to the host 1 (Step S1).

Once the power-on reset of the host 1 is executed, the host-side communication control device 100 starts to initialize firmware (Step S2).

Once the initialization of the host-side communication control device 100 is started, the host-side communication control device 100 and the I/O device-side communication control device 3 start coupling of a TCP session therebetween (Step S3).

A command-related I/O instruction is issued here from the host 1 after the initialization of the host-side communication control device 100 is started (Step S4). The host-side communication control device 100 receives the I/O instruction and returns a pseudo response for a notification of "busy" to the host 1 (Step S5). In this case, since there is no I/O instruction stored in the I/O instruction queue 113, the host-side communication control device 100 stores the received I/O instruction in the I/O instruction queue 113 without rearranging the I/O instruction queue 113.

Thereafter, the coupling of the TCP session between the host-side communication control device 100 and the I/O device-side communication control device 3 is completed (Step S6). When the coupling of the TCP session is completed, the initialization of the host-side communication control device 100 has not yet been completed.

Next, the host-side communication control device 100 transmits a system reset request (SYSTEMRESET_REQ) to the I/O device-side communication control device 3 (Step S7). The I/O device-side communication control device 3 receives the system reset request.

The host 1 issues a command-related I/O instruction here during this period (Step S8). Since the initialization has not been completed, the host-side communication control device 100 rearranges and stores the I/O instructions in accordance with the received I/O instruction and the types and the reception order of the I/O instructions stored in the I/O instruction queue 113 (Step S9). In this case, the host-side communication control device 100 discards the command-related I/O instruction previously stored in the I/O instruction queue 113 and stores the newly received command-related I/O instruction in the I/O instruction queue 113.

Thereafter, the host-side communication control device 100 returns a pseudo response for a notification of "busy" to the host 1 (Step S10).

The I/O device-side communication control device 3 transmits, to the host-side communication control device 100 a system reset response (SYSTEMRESET_RESP) to the system reset request (Step S11). Once the establishment of the logical path is completed thereafter, the I/O device-side communication control device 3 transmits a logical path status change response (LPATH_STSCHG_REP_STSCHG_REP) indicating the establishment of the network state to the host-side communication control device 100 (Step S12). The host-side communication control device 100 checks the establishment of the network by receiving the logical path status change response and ends the initialization processing.

After the completion of the initialization, the host-side communication control device 100 transmits the I/O instructions stored in the I/O instruction queue 113 to the I/O device-side communication control device 3 in the storage order and issues the I/O instructions stored in the I/O instruction queue 113 for the I/O device 4 (Step S13).

Thereafter, the I/O device-side communication control device 3 acquires a response to the I/O instructions from the I/O device 4. A case in which data is included in the response to the command-related I/O instructions stored in the I/O instruction queue 113 will be described here. The I/O device-side communication control device 3 transmits a response including the data received from the I/O device 4 to the host-side communication control device 100 (Step S14).

Once the response to the I/O instructions stored in the I/O instruction queue 113 is received, the host-side communication control device 100 transmits a busy state release notification to the host 1 (Step S15).

Thereafter, the host-side communication control device 100 transmits a response including the data received from the I/O device-side communication control device 3 to the host 1 (Step S16).

The processing included in the processing P1 in FIG. 6 is processing performed in the initialization of the host-side communication control device 100 here. During execution of the processing P1, the host-side communication control device 100 operates in the instruction standby processing mode and monitors the elapsed time from the start of the initialization using the timer. If the execution time of the processing P1 exceeds a predetermined time, the host-side communication control device 100 determines that the initialization processing has timed out. Processing included in the processing P2 in the processing P1 is processing for establishing a logical path. Through the processing P2, a logical path is established between the host-side communication control device 100 and the I/O device-side communication control device 3, and the I/O device 4 may be used by the host 1.

Figure 7:
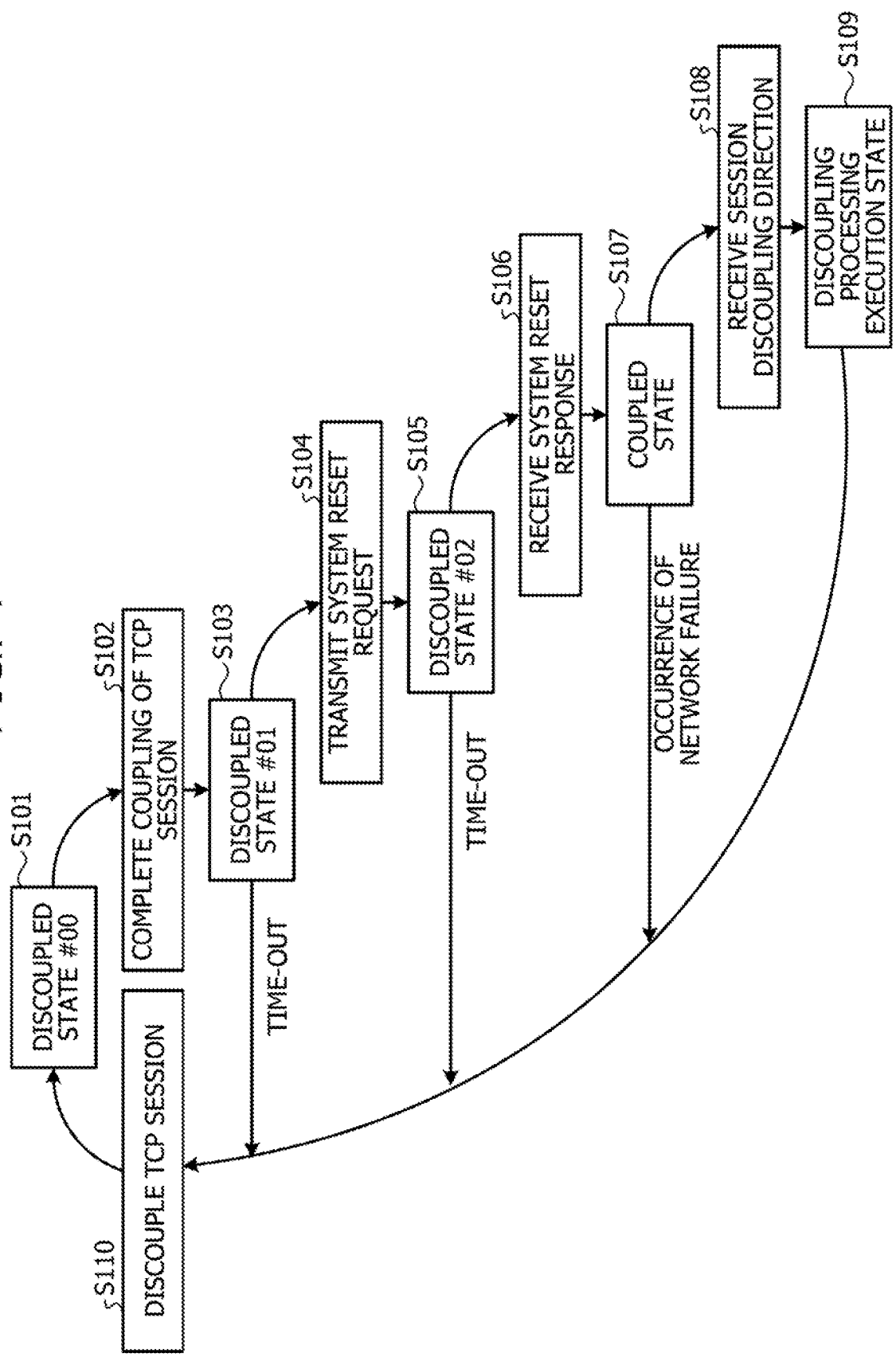
FIG. 7 is a state transition diagram illustrating a state of a logical path in initialization processing.

FIG. 7 is a state transition diagram illustrating a state of a logical path in the initialization processing. With reference to FIG. 7, the transition of the state of the logical path in the initialization processing of the host-side communication control device 100 will be described.

Before the initialization is started, no logical path is coupled between the host-side communication control device 100 and the I/O device-side communication control device 3 and, the host-side communication control device 100 and the I/O device-side communication control device 3 are in a discoupled state #00 (Step S101).

Thereafter, once the initialization is started, the coupling of the TCP session is completed (Step S102). Since the logical path is in a non-coupled state although the coupling of the TCP session is completed, the state of the logical path is the discoupled state #01 (Step S103) in this case.

Thereafter, the host-side communication control device 100 transmits a system reset request to the I/O device-side communication control device 3 (Step S104). In this manner, the state of the logical path transitions to the discoupled state #02 (Step S105). However, if a time-out of the initialization processing occurs in the discoupled state #01, the state of the logical path transitions to Step S110.

When the logical path is in the discoupled state #02, the host-side communication control device 100 receives a system reset response (Step S106). The host-side communication control device 100 receives a logical path state change response. In this manner, the state of the logical path transitions to a coupled state (Step S107). However, if time-out of the initialization processing occurs in the discoupled state #02, the state of the logical path transitions to Step S110.

When the logical path is in the coupled state and a network failure occurs, the state of the logical path transitions to Step S110.

When the logical path is in the coupled state and a direction to discouple the session is received from an administrator, the host-side communication control device 100 starts discoupling processing (Step S108). In this manner, the state of the logical path transitions to a discoupling processing execution state (Step S109). Thereafter, the state of the logical path transitions to Step S110.

In each state of the logical path, the TCP session between the host-side communication control device 100 and the I/O device-side communication control device 3 is discoupled (Step S110). The state of the logical path then returns to Step S101.

As described above, once the state of the logical path changes from the discoupled state #00 illustrated in FIG. 7 to the coupled state, the logical path is established between the host-side communication control device 100 and the I/O device-side communication control device 3. In this manner, the initialization of the host-side communication control device 100 is completed, and the host 1 may use the I/O device 4.

Figure 8:
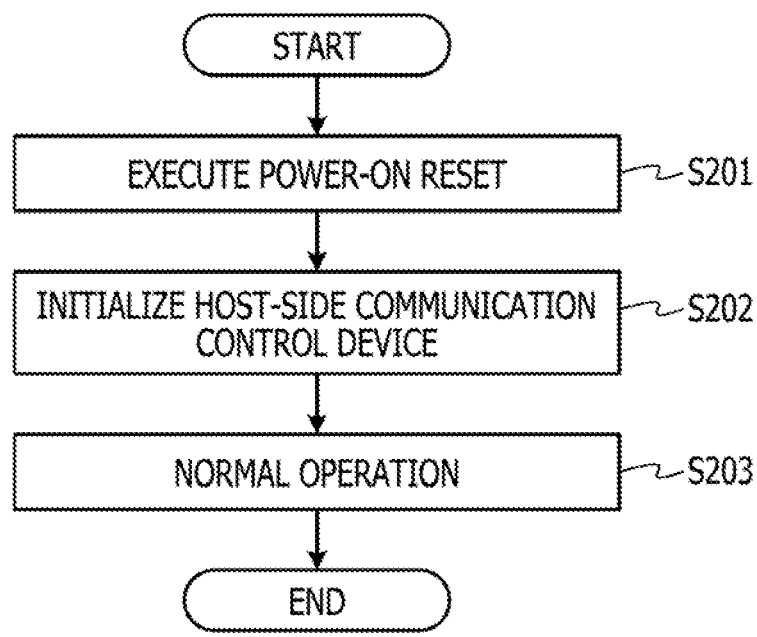
FIG. 8 is a flowchart of operations of the host-side communication control device according to the embodiment.

Next, with reference to FIG. 8, an overall flow of operations of the host-side communication control device 100 according to this embodiment will be described. FIG. 8 is a flowchart of operations of the host-side communication control device according to this embodiment.

Power is supplied to the host 1, and power-on reset is executed (Step S201).

Through the power-on reset of the host 1, the host-side communication control device 100 mounted in the host 1 executes the initialization of the device itself (Step S202). In this manner, network coupling is established between the host-side communication control device 100 and the I/O device-side communication control device 3.

After that, the host-side communication control device 100 executes a normal operation of transmitting and receiving an I/O instruction and a response to and from the I/O device-side communication control device 3 using the established network coupling (Step S203).

Figure 9:
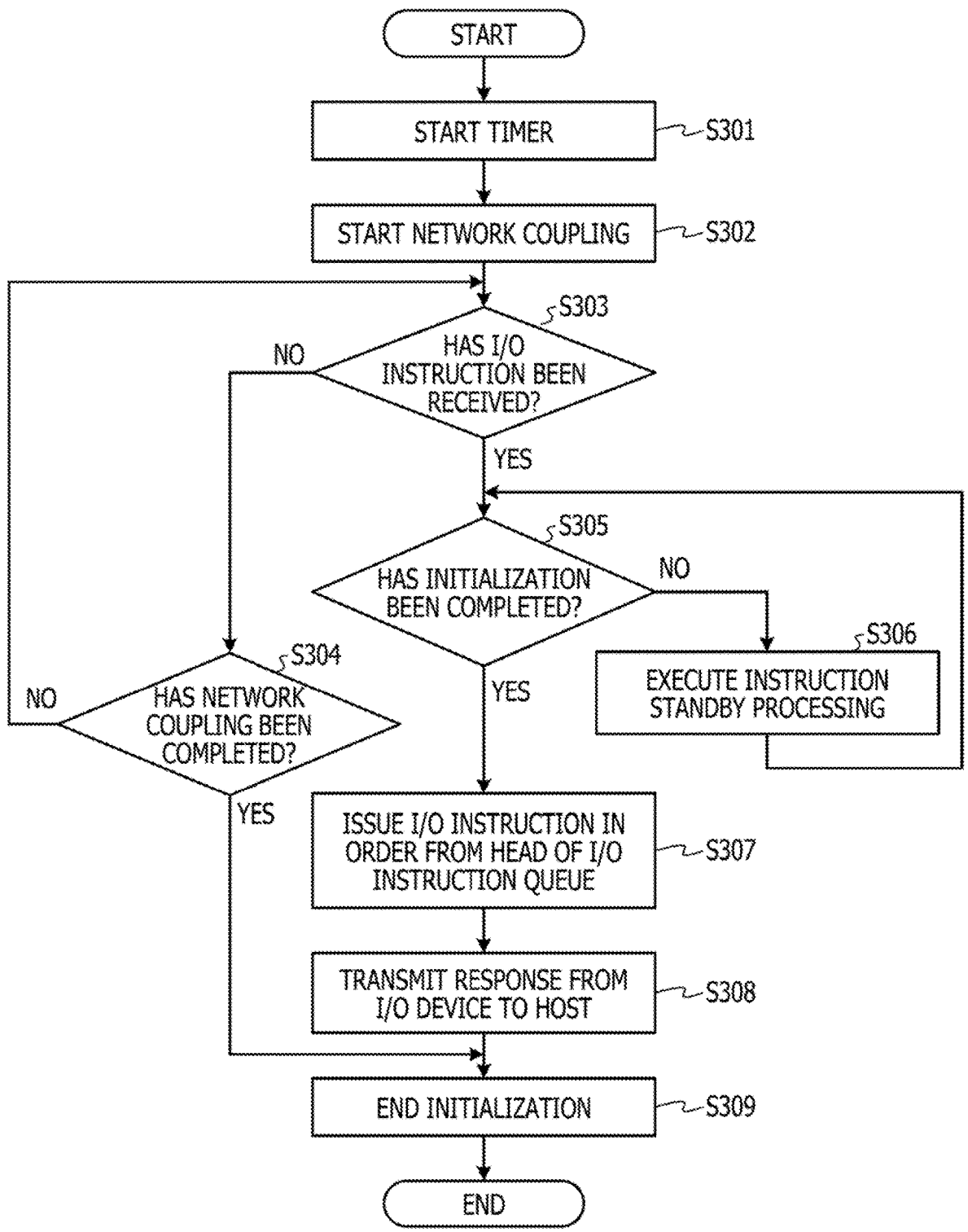
FIG. 9 is a flowchart of processing for initializing the host-side communication control device according to the embodiment.

Next, with reference to FIG. 9, a flow of the initialization processing of the host-side communication control device 100 according to this embodiment will be described. FIG. 9 is a flowchart of the initialization processing of the host-side communication control device according to this embodiment. The processing illustrated in the flowchart of FIG. 9 corresponds to an example of the processing executed in Step S202 in FIG. 8.

Once the power-on reset of the host 1 is executed, the initialization processing unit 132 starts to initialize the host-side communication control device 100. The initialization processing unit 132 then provides a direction to establish a network to the communication control unit 102. The initialization processing unit 132 notifies the network state updating unit 131 and the timer monitoring unit 133 of the start of initialization. The timer monitoring unit 133 starts its own timer for monitoring the time-out of the initialization (Step S301).

In response to the direction from the initialization processing unit 132, the communication control unit 102 starts to establish a network (Step S302).

Thereafter, the instruction determination unit 112 determines whether or not an I/O instruction has been received from the host 1 (Step S303). In a case in which no I/O instruction has been received (No in Step S303), the instruction determination unit 112 determines whether or not a logical path has been established and network coupling has been completed using the network state management table 201 (Step S304). In a case in which the network coupling has not completed (No in Step S304), the instruction determination unit 112 returns to Step S303.

On the other hand, in a case in which the network coupling has been completed (Yes in Step S304), the initialization processing moves on to Step S309.

On the other hand, in a case in which an I/O instruction has been received (Yes In Step S303), the instruction determination unit 112 and the instruction processing unit 111 determine whether or not the initialization processing has been completed using the network state management table 201 (Step S305).

In a case in which the initialization processing has not been completed (No in Step S305), the instruction determination unit 112 executes instruction standby processing along with the command-related instruction processing unit 114 and the cancellation-related instruction processing unit 115 (Step S306).

On the other hand, in a case in which the initialization processing has been completed (Yes in Step S305), the instruction processing unit 111 reads the I/O instructions from the I/O instruction queue 113 in the order from the head of the I/O instructions sequentially stored in the I/O instruction queue 113, and issues the I/O instructions for the I/O device 4 via the communication control unit 102 (Step S307).

The instruction processing unit 111 receives a response from the I/O device 4 via the communication control unit 102. The instruction processing unit 111 transmits a response from the I/O device 4 to the host 1 (Step S308).

In a case in which the network coupling has been completed without receiving the I/O instruction, or in a case in which a response to the I/O instruction stored in the I/O instruction queue 113 is received from the I/O device 4, the instruction determination unit 112 ends the initialization processing (Step S309). The I/O instruction processing unit 101 then transitions to the normal operation mode.

Figure 10:
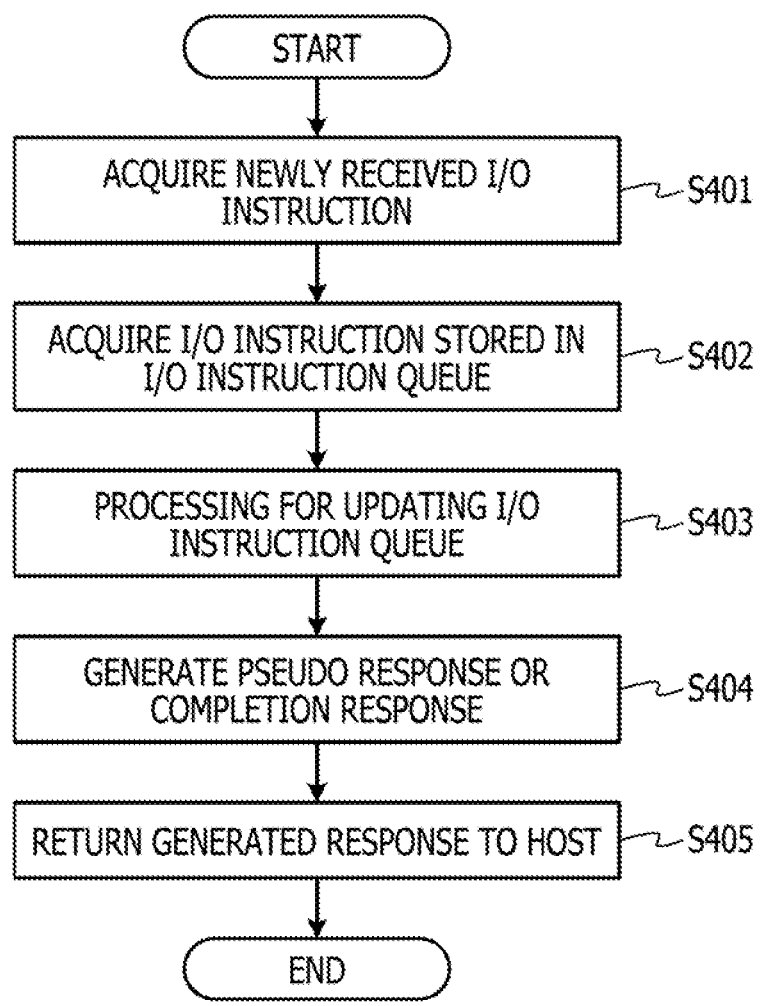
FIG. 10 is a flowchart of instruction standby processing executed by an I/O instruction processing unit.

Next, with reference to FIG. 10, the flow of the instruction standby processing executed by the I/O instruction processing unit 101 will be described. FIG. 10 is a flowchart of instruction standby processing executed by the I/O instruction processing unit. The processing illustrated in the flowchart of FIG. 10 corresponds to an example of the processing executed in Step S306 in FIG. 9.

The instruction determination unit 112 acquires the I/O instruction newly received from the host 1 (Step S401).

Next, the instruction determination unit 112 acquires the I/O instruction stored in the I/O instruction queue 113 (Step S402).

The instruction determination unit 112 determines whether or not the received I/O instruction is a command-related instruction. In a case of the instruction update storage unit 141 of the command-related instruction processing unit 114 or the cancellation-related instruction processing unit 115, the instruction update storage unit 151 executes processing for updating the I/O instruction queue 113 (Step S403).

Thereafter, if the received I/O instruction is a command-related instruction, the pseudo response execution unit 142 of the command-related instruction processing unit 114 generates a pseudo response. If the received I/O instruction is a cancelation-related instruction, the completion response execution unit 152 of the cancellation-related instruction processing unit 115 generates a completion response (Step S404).

Thereafter, if the received I/O instruction is a command-related instruction, the pseudo response execution unit 142 of the command-related instruction processing unit 114 returns the generated pseudo response to the host 1. If the received I/O instruction is a cancellation-related instruction, the completion response execution unit 152 of the cancellation-related instruction processing unit 115 returns the generated completion response to the host 1 (Step S405).

Figure 11:
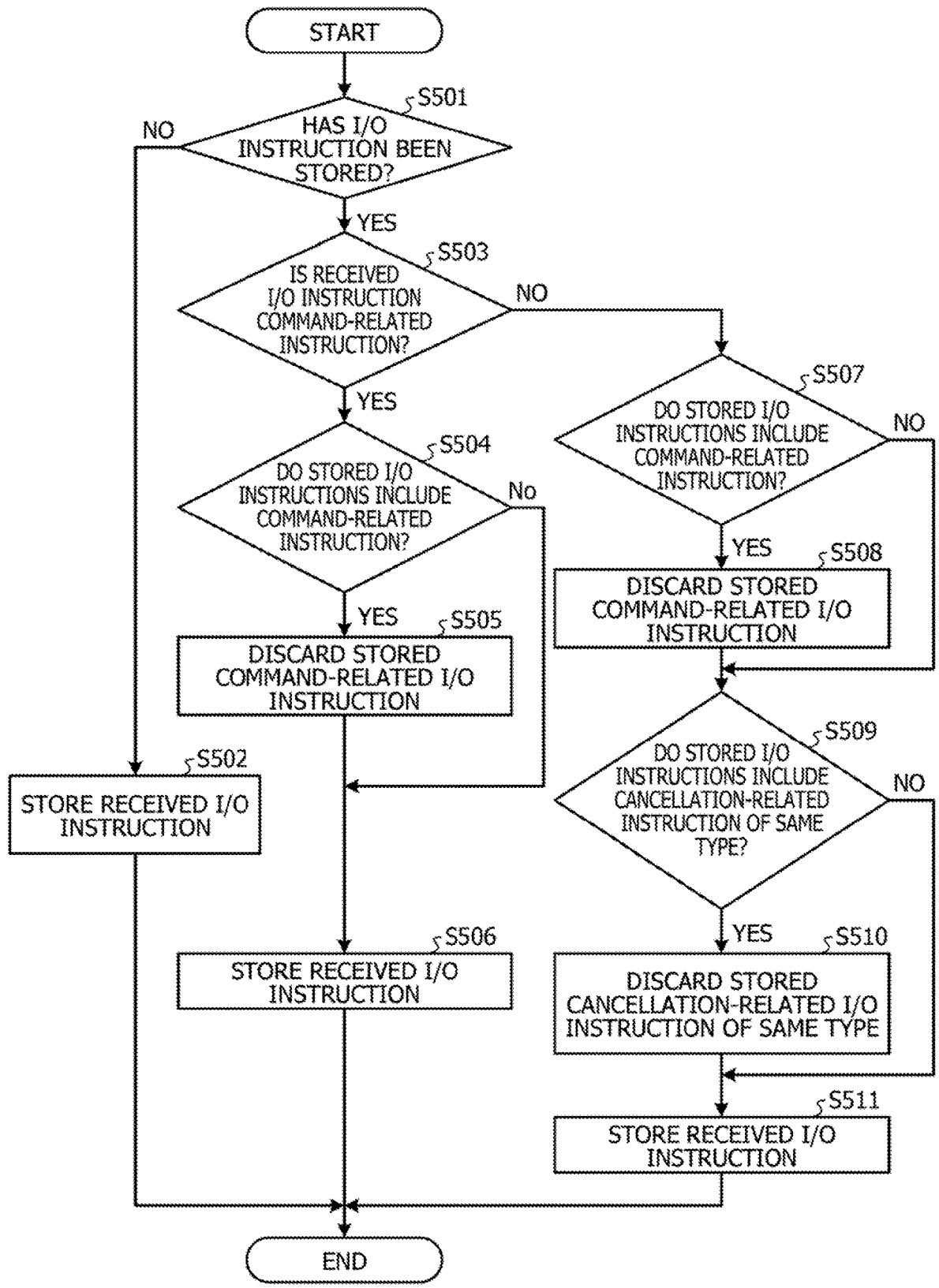
FIG. 11 is a flowchart of processing for updating an I/O instruction queue.

Next, a flow of the processing for updating the I/O instruction queue 113 will be described with reference to FIG. 11. FIG. 11 is a flowchart of the processing for updating the I/O instruction queue. The processing illustrated in the flowchart of FIG. 11 corresponds to an example of the processing executed in Step S403 in FIG. 10.

The instruction determination unit 112 determines whether or not an I/O instruction has been stored in the I/O instruction queue 113 (Step S501).

When no I/O instruction is present in the I/O instruction queue 113 (No in Step S501), the instruction determination unit 112 saves a received I/O instruction in the I/O instruction queue 113 (Step S502).

On the other hand, in a case in which the I/O instruction has already been stored in the I/O instruction queue 113 (Yes in Step S501), the instruction determination unit 112 determines whether or not the received I/O instruction is a command-related I/O instruction (Step S503).

In a case in which the received I/O instruction is a command-related instruction (Yes in Step S503), the instruction determination unit 112 outputs the received I/O instruction to the command-related instruction processing unit 114. The command-related instruction processing unit 114 receives an input of the received I/O instruction. The instruction update storage unit 141 then determines whether or not I/O instructions stored in the I/O instruction queue 113 includes a command-related instruction (Step S504). In a case in which no command-related instruction is included in the stored I/O instructions (No in Step S504), the instruction update storage unit 141 moves on to Step S506.

On the other hand, in a case in which the I/O instructions stored in the I/O instruction queue 113 include a command-related instruction (Yes in Step S504), the instruction update storage unit 141 discards the command-related I/O instruction stored in the I/O instruction queue 113 (Step S505).

The instruction update storage unit 141 then stores the received I/O instruction at the end of the I/O instruction queue 113.

On the other hand, in a case in which the received I/O instruction is a cancellation-related instruction (No in Step S503), the instruction determination unit 112 outputs the received I/O instruction to the cancellation-related instruction processing unit 115. The cancellation-related instruction processing unit 115 receives an input of the received I/O instruction. The instruction update storage unit 151 then determines whether or not the I/O instructions stored in the I/O instruction queue 113 include a command-related instruction (Step S507). In a case in which no command-related instruction is included in the stored I/O instructions (No in Step S507), the instruction update storage unit 151 moves on to Step S509.

On the other hand, in a case In which the I/O instructions stored in the I/O instruction queue 113 include a command-related instruction (Yes in Step S507), the instruction update storage unit 151 discards the command-related I/O instruction stored in the I/O instruction queue 113 (Step S508).

Next, the instruction update storage unit 151 determines whether or not a cancellation-related I/O instruction of the same type as the received I/O instruction is present in the I/O instructions stored in the I/O instruction queue 113 (Step S509). In a case in which no cancellation-related I/O instruction of the same type as the stored I/O instruction is present (No in Step S509), the instruction update storage unit 151 moves on to Step S511.

On the other hand, in a case in which a cancellation-related I/O instruction of the same type as the stored I/O instruction is present (Yes in Step S509), the instruction update storage unit 151 discards the stored cancellation-related I/O instruction of the same type as the received I/O instruction (Step S510).

Thereafter, the instruction update storage unit 151 stores the received I/O instruction at the end of the I/O instruction queue 113 (Step S511).

(Hardware Configuration)

Figure 12:
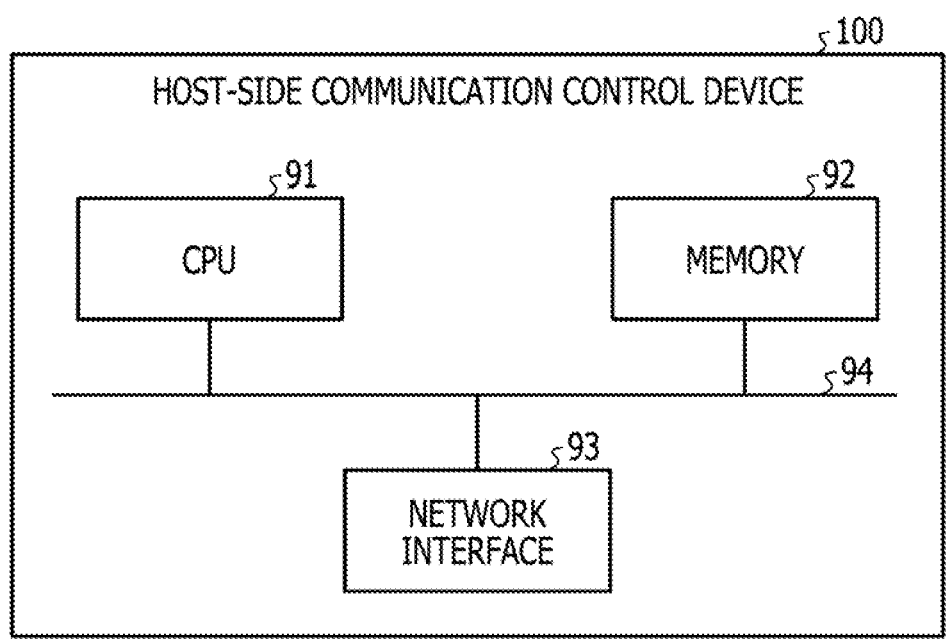
FIG. 12 is a hardware configuration diagram of the host-side communication control device.

FIG. 12 is a hardware configuration diagram of the host-side communication control device. As illustrated In FIG. 12, the host-side communication control device 100 includes, for example, a CPU 91, a memory 92, and a network interface 93. The CPU 91, the memory 92, and the network interface 93 are coupled by a bus 94.

The bus 94 is coupled to a bus extending from the I/O processor 10 of the host 1. The network interface 93 is an interface for coupling to the I/O device-side communication control device 3 via the wide area network 2.

The memory 92 implements the functions of the I/O instruction queue 113 and the network state storage unit 104 illustrated in FIG. 2. The memory 92 stores various programs including a program for implementing the functions of the I/O instruction processing unit 101, the communication control unit 102, and the network processing unit 103 illustrated in FIG. 2.

The CPU 91 reads various programs stored in the memory 92, loads the programs over the memory 92, and executes the programs, thereby implementing the functions of the I/O instruction processing unit 101, the communication control unit 102, and the network processing unit 103 illustrated in FIG. 2.

As described above, the host-side communication control device according to the present embodiment determines the arrangement of the I/O instructions and updates the FIFO queue based on the received I/O instructions and the types and reception order of the I/O instructions stored in the queue during the initialization of the host-side communication control device at the time of the power-on reset of the host. Once the initialization is completed thereafter, the host-side communication control device acquires the I/O instructions stored in the queue in the arrangement order and issues the I/O instructions for the I/O device. For example, the host-side communication control device may receive an I/O instruction that may not be retransmitted from the host, such as a cancellation-related I/O instruction, in a state in which the I/O device may not be used due to temporary interruption of the network during initialization. Even in such a case, the host-side communication control device may store an instruction that may not be retransmitted again and issue the instruction for the I/O device after the network coupling is established. Accordingly, it is possible to curb non-execution of the instruction.

Also, the I/O instructions may be executed in the processing order indicated by the host by determining the arrangement of the I/O instructions in the queue based on the types of the I/O instructions and the anteroposterior relationship determined by the reception order. As described above, the host-side communication control device according to this embodiment may appropriately process the I/O instructions, which have been received during the initialization, after the completion of the initialization. Further, it is possible to curb the number of I/O instructions stored in the queue and to reduce a memory region in the host-side communication control device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication control device, comprising:
a memory; and
a processor coupled to the memory and the processor configured to:
store, in the memory, instructions of standby processing in a specific processing order,
when a network coupling is being established to perform communication, acquire specific instructions transmitted from a device,
determine whether a stored instruction that is same type as the specific instructions is stored in the memory,
update, in the memory, the instructions of standby processing based on a type of the specific instructions, a type of the instructions of standby processing and a relationship specified by order in which the specific instructions are acquired, by deleting the stored instruction, and
after an establishment of the network coupling is completed, perform the update instructions of standby processing in a specific processing order.

2. The communication control device according to claim 1, wherein the processor configured to:
determine any of the instructions of standby processing based on a type of the specific instructions, a type of the instructions of standby processing and a relationship specified by the order in which the specific instructions are acquired,
delete, in the memory, the determined any of the instructions of standby processing, and
store, in the memory, the specific instructions as the instructions of standby processing to be processed after existing instructions of standby processing.

3. The communication control device according to claim 1, wherein the processor configured to:
when the specific instructions are an instruction to execute processing, determine in advance to an instruction transmission source, and
when the specific instructions are an instruction to discard the specific instructions or initialize the communication control device, return a completion response to the instruction transmission source.

4. A communication control method executed by a computer, the communication control method comprising:
storing, in the memory, instructions of standby processing in a specific processing order;
when a network coupling is being established to perform communication, acquiring specific instructions transmitted from a device;
determining whether a stored instruction that is same type as the specific instructions is stored in the memory;
updating, in the memory, the instructions of standby processing based on a type of the specific instructions, a type of the instructions of standby processing and a relationship specified by order in which the specific instructions are acquired, by deleting the stored instruction; and
after an establishment of the network coupling is completed, performing the update instructions of standby processing in a specific processing order.

5. The communication control method according to claim 4, further comprising:
determining any of the instructions of standby processing based on a type of the specific instructions, a type of the instructions of standby processing and a relationship specified by the order in which the specific instructions is acquired;
deleting, in the memory, the determined any of the instructions of standby processing; and
storing, in the memory, the specific instructions as the instructions of standby processing to be processed after existing instructions of standby processing.

6. The communication control method according to claim 4, further comprising:
when the specific instructions are an instruction to execute processing, determining in advance to an instruction transmission source; and
when the specific instructions are an instruction to discard the specific instructions or initialize the communication control device, returning a completion response to the instruction transmission source.

7. A non-transitory computer-readable storage medium storing a program that causes a computer to execute a process, the process comprising:
storing, in the memory, instructions of standby processing in a specific processing order;
when a network coupling is being established to perform communication, acquiring specific instructions transmitted from a device;
determining whether a stored instruction that is same type as the specific instructions is stored in the memory;
updating, in the memory, the instructions of standby processing based on a type of the specific instructions, a type of the instructions of standby processing and a relationship specified by order in which the specific instructions are acquired, by deleting the stored instruction; and after an establishment of the network coupling is completed, performing the update instructions of standby processing in a specific processing order.

\* \* \* \* \*